(12) United States Patent
Iimori et al.

(10) Patent No.: US 7,640,812 B2
(45) Date of Patent: Jan. 5, 2010

(54) FLEXIBLE BOARD SENSOR AND MANUFACTURING METHOD OF SENSOR

(75) Inventors: Yukinobu Iimori, Tokyo (JP); Nobuaki Yamada, Tokyo (JP); Shuji Tohyama, Tokyo (JP); Takayuki Yokoyama, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 12/050,374

(22) Filed: Mar. 18, 2008

(65) Prior Publication Data
US 2008/0236290 A1 Oct. 2, 2008

(30) Foreign Application Priority Data
Mar. 26, 2007 (JP) ............... 2007-079517

(51) Int. Cl.
*G01L 7/08* (2006.01)
(52) U.S. Cl. ........................ 73/715
(58) Field of Classification Search ........... 73/700–756; 361/283.1–283.4
See application file for complete search history.

(56) References Cited

U.S. PATENT DOCUMENTS

| 4,064,758 | A | * | 12/1977 | Harrison | 73/726 |
| 4,567,395 | A | * | 1/1986 | Pundarika | 310/338 |
| 5,038,069 | A | * | 8/1991 | Lukasiewicz et al. | 310/338 |
| 6,003,379 | A | * | 12/1999 | Ichikawa et al. | 73/708 |
| 7,263,891 | B2 | * | 9/2007 | Oda | 73/715 |
| 7,316,164 | B2 | * | 1/2008 | Toyoda et al. | 73/723 |

FOREIGN PATENT DOCUMENTS

| JP | 61-140934 | | 9/1986 |
| JP | 07181576 A | * | 7/1995 |
| JP | 9-318480 | | 12/1997 |
| JP | 2003-258388 | | 9/2003 |
| JP | 2004264093 A | * | 9/2004 |
| JP | 2005-326337 | | 11/2005 |
| JP | 2006-038824 | | 2/2006 |

* cited by examiner

*Primary Examiner*—Lisa M Caputo
*Assistant Examiner*—Jermaine Jenkins
(74) *Attorney, Agent, or Firm*—Rankin, Hill & Clark LLP

(57) ABSTRACT

A cap is provided on a diaphragm, and a first end of a flexible board is connected to the cap. A cover is attached to the cap. The cover directs a second end of the flexible board in a direction away from the diaphragm held by a joint so that the flexible board is supported while being curved. Since the flexible board is not locally bent at an acute angle, a crack is not generated on a copper pattern provided on the flexible board.

5 Claims, 7 Drawing Sheets

FLEXIBLE BOARD SENSOR AND MANUFACTURING METHOD OF SENSOR

The priority application Number JP 2007-079517 upon which this patent application is based is hereby incorporated by reference.

BACKGROUND OF THE INVENTION

1. Field of the Invention

The present invention relates to a sensor having a sensor element and a flexible board with an end connected to a measuring portion of the sensor element.

2. Description of Related Art

A pressure sensor for measuring fluid pressure by measuring physical quantities is known.

A conventional example of such a pressure sensor includes: a pressure-sensitive element attached to an end of a pipe; a circuit board; and a flexible board having an end connected to the pressure-sensitive element and the other end connected to the circuit board (document: JP-A-2005-326337).

The flexible board is employed for transmitting a signal of the pressure-sensitive element to the circuit board. In the conventional example disclosed in the above document, the flexible board is bent for accommodating within the pipe.

Since the flexible board of the conventional example disclosed in the above-mentioned document is bent for accommodating within the pipe, copper pattern provided on the flexible board may be cracked or otherwise damaged when the flexible board is bent for accommodating within the pipe. In order not to cause cracks and the like on the copper pattern, the bending angle of the flexible board has to be increased, which requires a large accommodation space for the flexible board.

SUMMARY OF THE INVENTION

An object of the invention is to provide a sensor that does not cause damage on a flexible board when the flexible board is bent to be accommodated and is capable of accommodating the flexible board with a compact space, and a manufacturing method of the sensor.

A sensor according to an aspect of the invention includes: a sensor element provided with a measuring portion and attached to a joint; a cap provided on the measuring portion of the sensor element; a flexible board having a first end connected to the cap and a second end extending in a direction away from the sensor element; and a cover that supports the flexible board while the flexible board is curved, the cover being attached to the cap or the sensor element.

In the above arrangement, after the cap is attached to the sensor element and the first end of the flexible board is connected to the cap by thermocompression-bonding using an adhesive sheet and the like, the cover is attached to the cap or the sensor element and the flexible board is curved along the cover.

Since the flexible board the first end of which is connected to the sensor element, is supported by the cover while being curved, the flexible board is not bent locally at an acute angle. Accordingly, a crack is not generated on the electro-conductive portion, a copper pattern for instance, provided on the flexible board. In addition, since the flexible board is bent along the cover, the flexible board is bent by a minimum required angle within a narrow space, thus reducing the accommodation space of the flexible board.

In the above aspect, it is preferable that a board holder for holding the flexible board is provided within the joint.

According to the above arrangement, since the first end of the flexible board is not only supported by the cover but a part near the second end is held and fixed by the board holder, both of the ends of the flexible board are securely supported even when the sensor itself is vibrated. Therefore, while, using the sensor, the damage on the electro-conductive portion of the flexible board can be prevented.

Further, in the above aspect of the invention, it is preferable that the sensor element is airtightly bonded to the joint, and the board holder intercommunicates a sensor-interior space near the sensor element and another sensor-interior space remote from the sensor element.

According to the above arrangement, since the two sensor spaces sandwiching the board holder are intercommunicated even when the inside of the sensor is kept airtight, the inside of the sensor does not become excessively humid even when the temperature and humidity is changed, so that the sensor can sufficiently adapt itself to the change in the sensor environment.

In the above aspect of the invention, the board holder may preferably have an elasticity.

According to the above arrangement, the flexible board is pressed onto the cover by the elastic force of the board holder, so that the displacement of the flexible board when the sensor is vibrated can be further effectively restrained.

In the above aspect of the invention, it is preferable that the cover has an arc surface that supports the flexible board while the flexible board is curved.

According to the above arrangement, since the flexible board can be curved along the arc surface, the bending of the flexible board at an acute angle can be effectively prevented.

A manufacturing method according to another aspect of the invention is for manufacturing the sensor of the above aspect of the invention, the method includes:

attaching a cap on the sensor element; connecting the first end of the flexible board on the cap; attaching the cover on the cap or the sensor element; curving the flexible board along the cover; and directing the second end of the flexible board in a direction away from the sensor element to hold the flexible board within the joint.

According to the above aspect of the invention, the manufacturing method for a sensor that can exhibit the same advantages as in the above can be provided.

DETAILED DESCRIPTION OF PREFERRED EMBODIMENT(S)

A first exemplary embodiment of the invention will be described below with reference to attached drawings.

Figure 1:
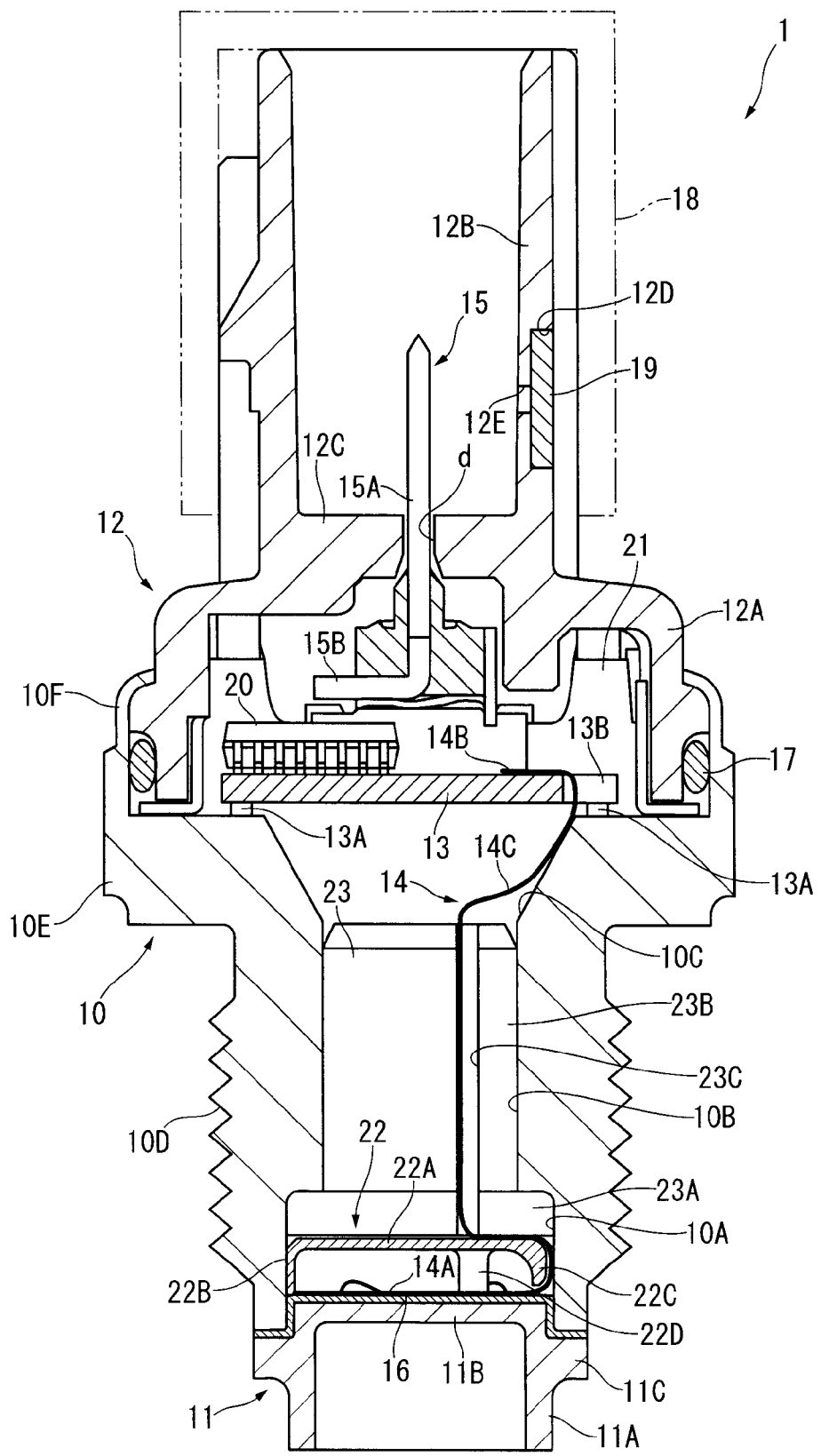
FIG. 1 is a cross section of a pressure sensor according to a first exemplary embodiment of the invention.

FIG. 1 is a cross section of a pressure sensor of the first exemplary embodiment.

As shown in FIG. 1, the pressure sensor 1 is provided with: a joint 10 having a space formed therein; a diaphragm 11 (sensor element) provided on a first end of the joint 10; a housing 12 provided on a second end of the joint 10; a circuit board 13 provided within a space defined by the housing 12 and the joint 10; a flexible board 14 connected to the circuit board 13 and the diaphragm 11; and a terminal 15 supported by the housing 12.

The joint 10 is a metal component having a series of: a hole 10A enlarging from a first end toward a second end thereof; a hole 10B having smaller diameter than the hole 10A; and a tapered hole 10C of which diameter increases toward the other end.

An outer circumference of the joint 10 is provided with a screw 10D to be screwed into a pipe (not shown) in which to-be-measured fluid is flowed and a flange 10E formed on a side adjacent to the second end relative to the screw 10D.

The flange 10E has an approximately cylindrical exterior portion 10F for crimping the housing 12. A distal end of the exterior portion 10F is bent toward the axial center of the joint 10.

The diaphragm 11 is provided by a metal component, which includes: a cylindrical member 11A; a disk 11B provided on a first end of the cylindrical member 11A; and a flange 11C provided on an outer circumference of the cylindrical member 11A, the cylindrical member 11A, the disk 11B and the flange 11C being provided in an integrated manner. The to-be-measured fluid is introduced into a space provided inside the cylindrical member 11A and the disk 11B of the diaphragm 11.

A measuring portion that detects the pressure by a strain gauge and the like is provided on a side of the disk 11B of the diaphragm 11 opposite to a side on which the to-be-measured fluid is introduced. A cap 16 is provided to cover an upper side of the measuring portion. The cap 16 is thermocompression-bonded to a first end of the flexible board 14.

The end surface of the flange 11C and the first end of the joint 10 are airtightly bonded by welding and the like.

The housing 12 is a synthetic resin component, which has a substantially cylindrical bottomed base end 12A and a cylindrical distal end 12B integrated with the base end 12A.

A periphery of the base end 12A is fitted into the exterior portion 10F of the joint 10. An O ring 17 is provided between the inner circumference of the exterior portion 10F and the outer circumference of the base end 12A.

The terminal 15 is held by a disk 12C provided between the base end 12A and the distal end 12B. A gap d is provided between the terminal 15 and the disk 12C. The gap d is for adjusting the variable pressure within the space surrounded by the joint 10, the diaphragm 11 and the housing 12.

The distal end 12B is adapted to be connected with a connector 18. An air-vent filter 19 that allows circulation of exterior air is provided on the distal end 12B at a position covered by the connector 18.

The air-vent filter 19 satisfies both requirements of waterproof property and air permeability, which is substantially formed in a disk-shape. A recess 12D for the air-vent filter 19 to be fitted is provided on the outer circumference of the distal end 12B. An air-vent 12E is connected to the recess 12D.

The circuit board 13 is sized so as to cover the opening of the hole 10C of the joint 10, both ends of which are supported on an end surface of the flange 10E with an attachment 13A. Electronic components 20 are mounted on the circuit board 13.

A cut 13B is provided on an end of the circuit board 13. The flexible board 14 is inserted through the cut 13B.

The flexible board 14 includes a first end 14A, having a whole area connected to the cap 16, a second end 14B connected to the circuit board 13, and a belt portion 14C that connects the first end 14A and the second end 14B. The first end 14A is electrically coupled with the diaphragm 11 by a bonding wire. A part of the belt portion 14C is fixed onto the joint 10 by an adhesive.

Figure 2:
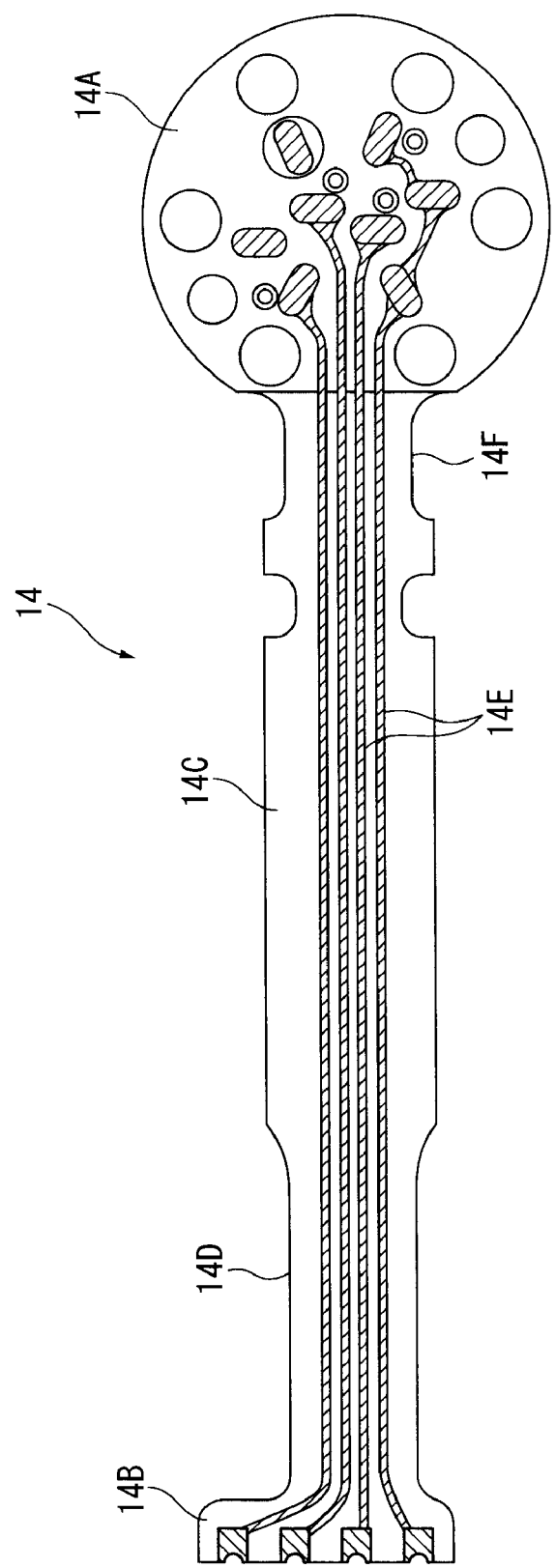
FIG. 2 is an expansion plan of a flexible board.

An expansion plan of the flexible board 14 is shown in FIG. 2.

As shown in FIG. 2, the first end 14A of the flexible board 14 is formed substantially in a disc to cover the cap 16, on which a plurality of holes for wire-bonding and for attaching below-described cover are provided at predetermined positions. The second end 14B is a rectangular component to be connected with the circuitry of the circuit board 13. The recessed dents 14D to be engaged with the cut 13B of the circuit board 13 are respectively provided along both sides of the belt portion 14C. The belt portion 14C and the first end 14A are capable of being bent approximately at a right angle.

A copper pattern 14E is formed on a side of the first end 14A, the belt portion 14C and the second end 14B.

As shown in FIG. 1, the terminal 15 is bent substantially in an L-shape. A first end 15A of the terminal 15 is supported by the housing 12 while a second end 15B thereof is electrically coupled with the circuit board 13.

The bent portion of the terminal 15 is fixed on a case 21 that is attached to the flange 10E of the joint 10.

A cover 22 that supports the flexible board 14 while being curved is attached on the cap 16. A board holder 23 for holding the flexible board 14 is attached on the cover 22.

Figure 3:
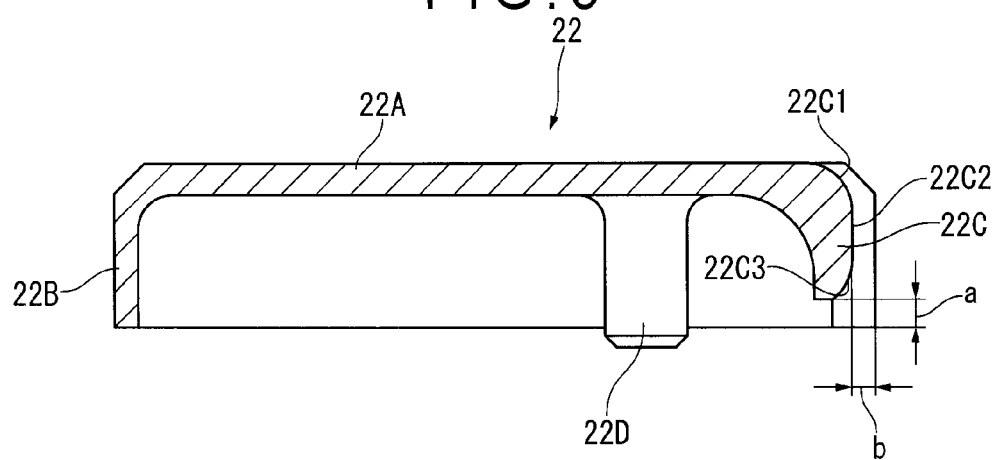
FIG. 3 is a cross section of a cover.
Figure 4:
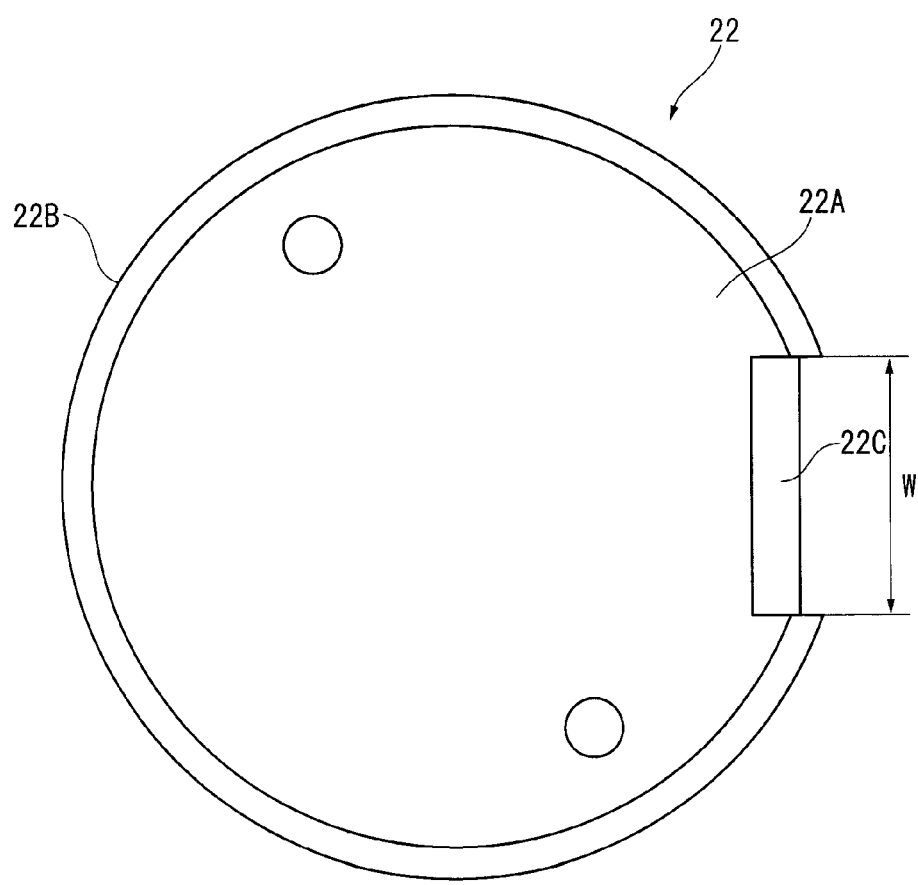
FIG. 4 is a plan view of the cover.
Figure 5:
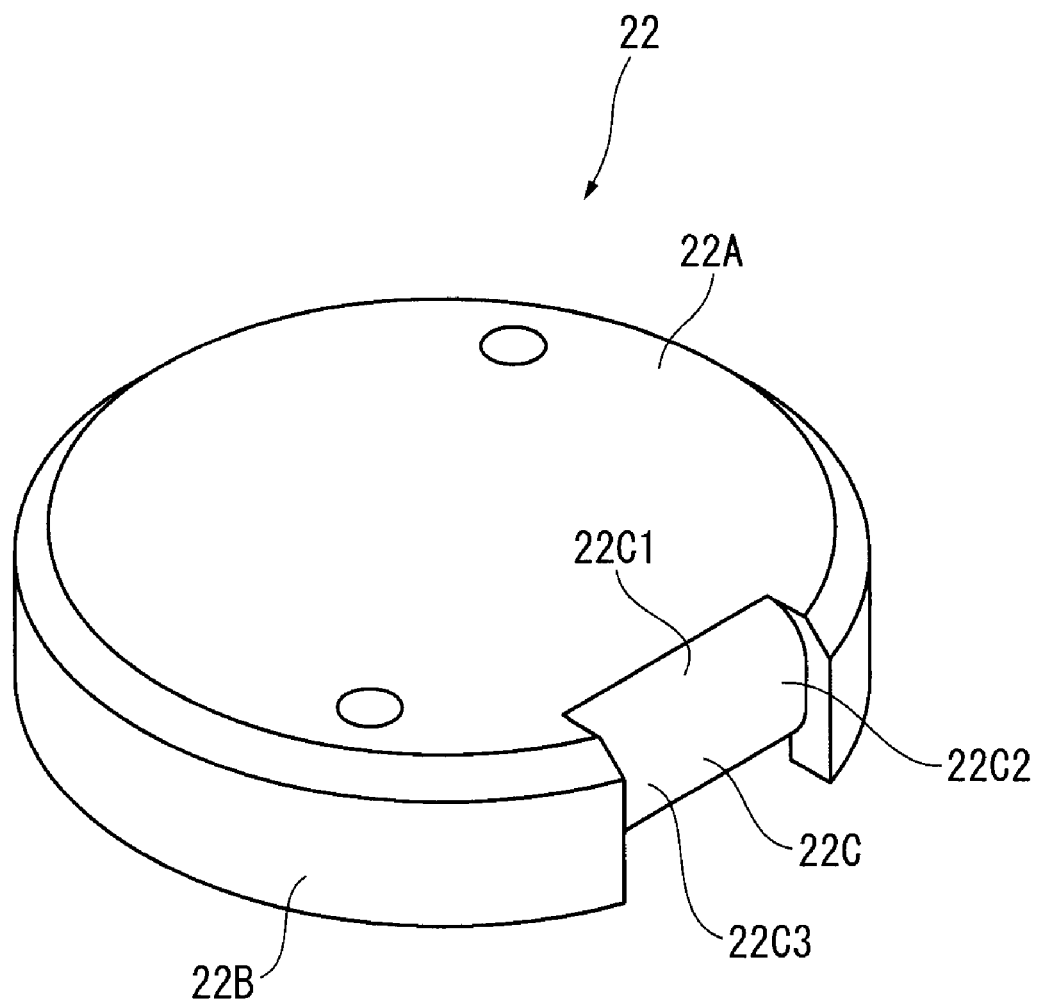
FIG. 5 is a perspective view of the cover.

Specific construction of the cover 22 is shown in FIGS. 3 to 5.

FIG. 3 is a cross section of the cover 22, FIG. 4 is a plan view of the cover 22 and FIG. 5 is a perspective view of the cover 22.

As shown in FIGS. 3 to 5, the cover 22 is a substantially cap-shaped molded component of synthetic resin and the like, which includes a disk 22A, an outer circumference 22B integrally provided on the outer periphery of the disk 22A, an arc surface 22C provided by cutting a part of the outer circumference 22B and a leg 22D integrated with the disk 22A.

The diameter of the outer circumference 22B is substantially the same as that of the hole 10A of the joint 10 (see FIG. 1).

The arc surface 22C supports the flexible board 14 in a curved state, which includes a curved section 22C1, a straight section 22C2 continuous with the curved section 22C1 and a curved section 22C3 continuous with the straight section 22C2. A dimension difference a between the distal end of the curved section 22C3 and the periphery of the outer circumference 22B is approximately the same as the thickness of the flexible board 14. The straight section 22C2 is recessed from the surface of the outer circumference 22B by a dimension b, which is substantially equal to the thickness of the flexible board 14. Further, a width W of the arc surface 22C is substantially equal to a width of the belt portion 14F of the flexible board 14.

The leg 22D protrudes from the periphery of the outer circumference 22B so that a distal end of the leg 22D can be fitted into a hole provided on the first end 14A of the flexible board 14.

Figure 6:
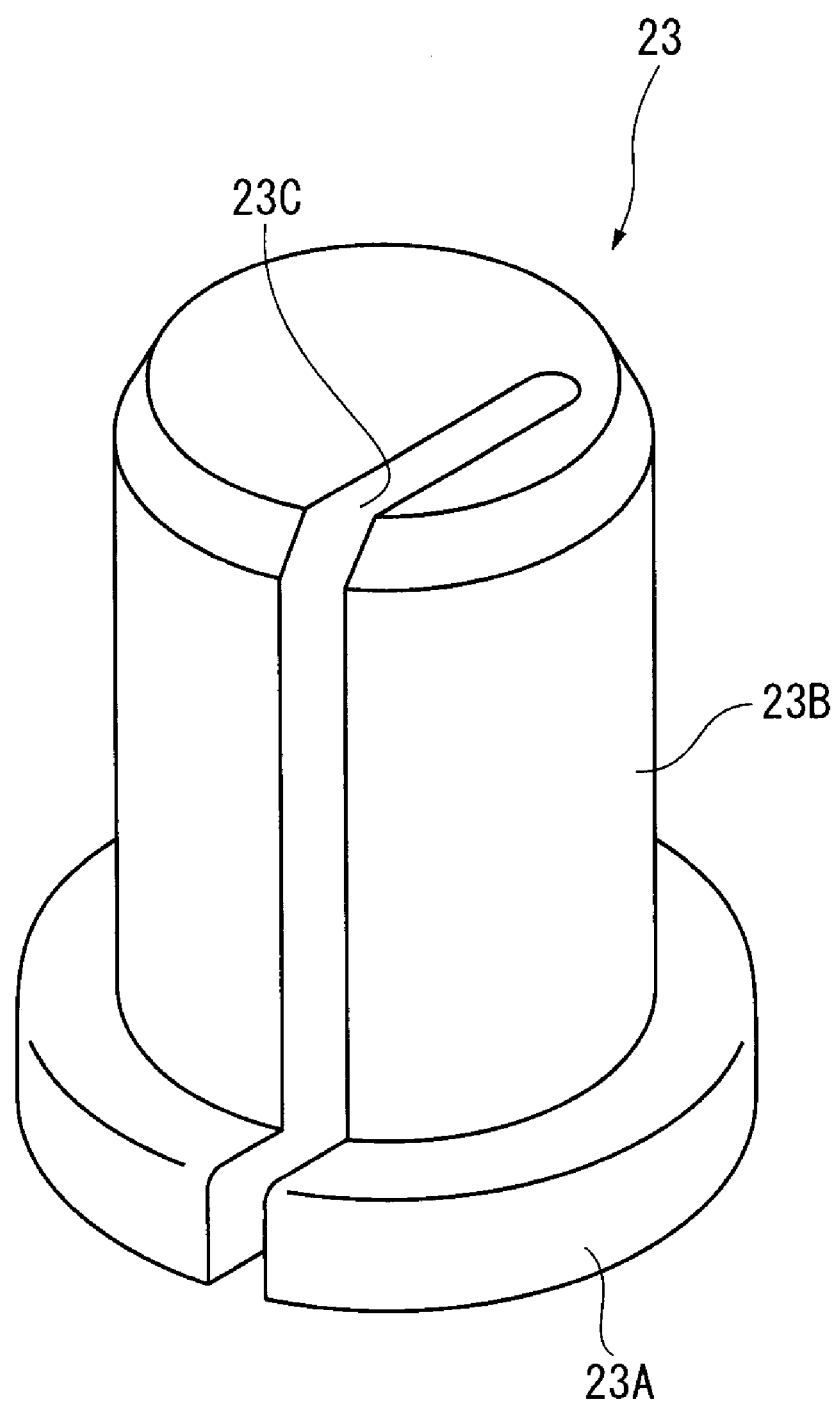
FIG. 6 is a perspective view of the board holder.

FIG. 6 shows a specific construction of the board holder 23. As shown in FIG. 6, the board holder 23 includes a base section 23A to be in contact with the disk 22A of the cover 22 and a column section 23B integrated with the base section 23A.

As shown in FIG. 1, the base section 23A is fitted into the hole 10A of the joint 10 and the column section 23B is fitted into the hole 10B. Accordingly, the board holder 23 is fixed within the joint 10.

A slit 23C for the flexible board 14 to be inserted is provided on the board holder 23 at a position remote from the axial center of the board holder 23. The slit 23C extends in a direction away from the diaphragm 11 to hold the belt portion 14C of the flexible board 14.

A depth of the slit 23C in the column section 23B is substantially equal to the width of the flexible board 14 and the gap dimension thereat is slightly larger than the thickness of the flexible board 14. Accordingly, a certain gap can be secured by the slit 23C even when the board holder 23 inserted into the flexible board 14 is fixed on the joint 10, thus tolerating pressure change within the cover 22.

The board holder 23 is made of an elastic cushion material. The cushion material is, for instance, a molding component of a foam rubber.

Next, how the pressure sensor 1 according to the first exemplary embodiment is assembled will be described with reference to FIG. 7.

Initially, the first end 14A of the flexible board 14 and the cap 16 are thermocompression-bonded with an adhesive sheet and the cap 16 is fixed on the diaphragm 11 by laser-welding.

Subsequently, the diaphragm 11 and the flexible board 14 are connected by wire-bonding using gold. Then, the cap 16 and the cover 22 are adhered and fixed by an adhesive.

Figure 7:
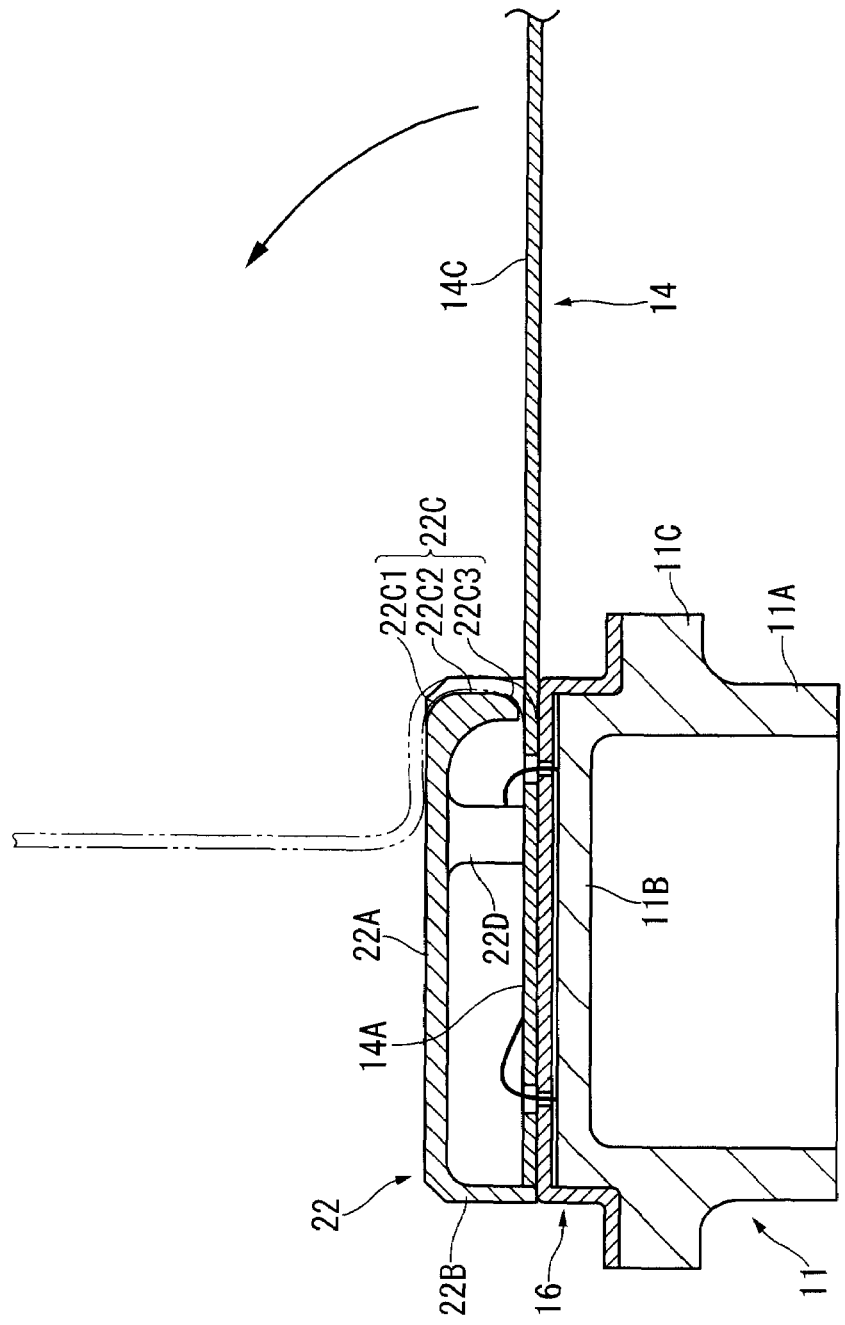
FIG. 7 is an illustration showing how the flexible board is bent along the cover.

As shown in FIG. 7, the belt portion 14C of the flexible board 14 is placed on the arc surface 22C of the cover 22 and is bent in an arc.

The belt portion 14C of the flexible board 14 is bent substantially at a right angle in a direction reverse to that in the preceding bending. Then, the board holder 23 is assembled with the flexed belt portion 14C and is compressed to be inserted into the joint 10 (see FIG. 1).

The joint 10 and the diaphragm 11 are airtightly connected by an electron-beam welding, the circuit board 13 is fixed on the flange 10E of the joint 10 and the circuit board 13 and the flexible board 14 are soldered. At this time, the flexible board 14 is soldered while being bent in an arc.

Subsequently, after fixing the flexible board 14 and the joint 10 with an adhesive and fixing the case 21 onto the joint 10 by projection-welding, the case 21 and the terminal 15 are crimped.

Then, the terminal 15 and the circuit board 13 are connected by precision resistance welding, the housing 12 assembled with the O ring 17 is inserted and the housing 12 is crimped to the joint 10.

According to the exemplary embodiment, the following advantages can be provided.

(1) The pressure sensor 1 includes the cap 16 provided on the diaphragm 11, the first end 14A of the flexible board 14 being connected to the cap 16 and the second end 14B of the flexible board 14 being held to extend in a direction away from the diaphragm 11, and the cover 22 that supports the flexible board 14 while being curved is attached to the cap 16. Accordingly, since the flexible board 14 is not locally bent at an acute angle, no crack is generated on the copper pattern 14E provided on the flexible board 14. Accordingly, the flexible board 14 can be bent at a required minimum angle within a narrow space, so that the size of the accommodating space of the flexible board 14 can be reduced.

(2) The belt portion 14C of the flexible board 14 having the first end connected to the cap 16 is held by the board holder 23 over a predetermined length and the board holder 23 is fixed within the joint 10. Accordingly, even when the sensor itself is vibrated while, for instance, using the sensor 1, the flexible board 14 can be securely supported, thereby preventing a damage on the copper pattern 14E on the flexible board 14.

In this regard, there is a gap between the flexible board connecting the circuit board and the sensor and an insulating member provided on an inner circumference of a case in the traditional example disclosed in JP-A-2006-38824, so that the flexible board is displaced by vibration and the like, which causes damage on the copper pattern provided on the flexible board.

(3) Since the base section 23A of the board holder 23 is supported by the cover 22, both of the ends of the flexible board 14 is supported by the cover 22 as well as the board holder 23, thereby stably supporting the board holder 23. Further, since the cover 22 is disposed between the board holder 23 and the cap 16, the board holder 23 does not interfere with the cap 16, so that the bonding wire provided on the first end 14A of the flexible board 14 is not damaged.

(4) The board holder 23 is an elastic cushion material, which provides excellent cushioning effect, so that the displacement of the flexible board 14 while the sensor is vibrated can be further efficiently restrained.

(5) Since the board holder 23 is molded by a foam rubber, air permeability of the foam rubber itself allows adaptation for the change in the temperature and environment.

(6) Since the cover 22 is provided with the arc surface 22C that supports the flexible board 14 while being curved, acute-bending of the flexible board 14 can be effectively prevented when the flexible board 14 is mounted on the cover 22.

(7) The air-vent filter 19 provided on the housing 12 allows communication between the inside of the sensor and the external air even when the inside of the housing 12 is sealed, thereby providing adaptation for the change in the external environment.

(8) Since the air-vent filter 19 is provided on the distal end 12B of the housing 12 at a position covered by the connector 18, water, oil and the like do not directly adhere to the air-vent filter 19, thereby preventing the air-vent filter 19 from being clogged.

(9) Since a part of the flexible board 14 is fixed on the interior wall of the joint 10, the flexible board 14 is not vibrated even when the sensor 1 itself is vibrated while, for instance, transporting the sensor 1, thereby preventing the copper pattern 14E from being damaged.

Next, a second exemplary embodiment of the invention will be described below with reference to FIG. 8. The second exemplary embodiment differs from the first exemplary embodiment in the structure of the board holder, while the rest of the arrangement is identical. Accordingly, in the following description of the second exemplary embodiment, the same components as those of the first exemplary embodiment are referenced by the same code to simplify the description thereof.

Figure 8:
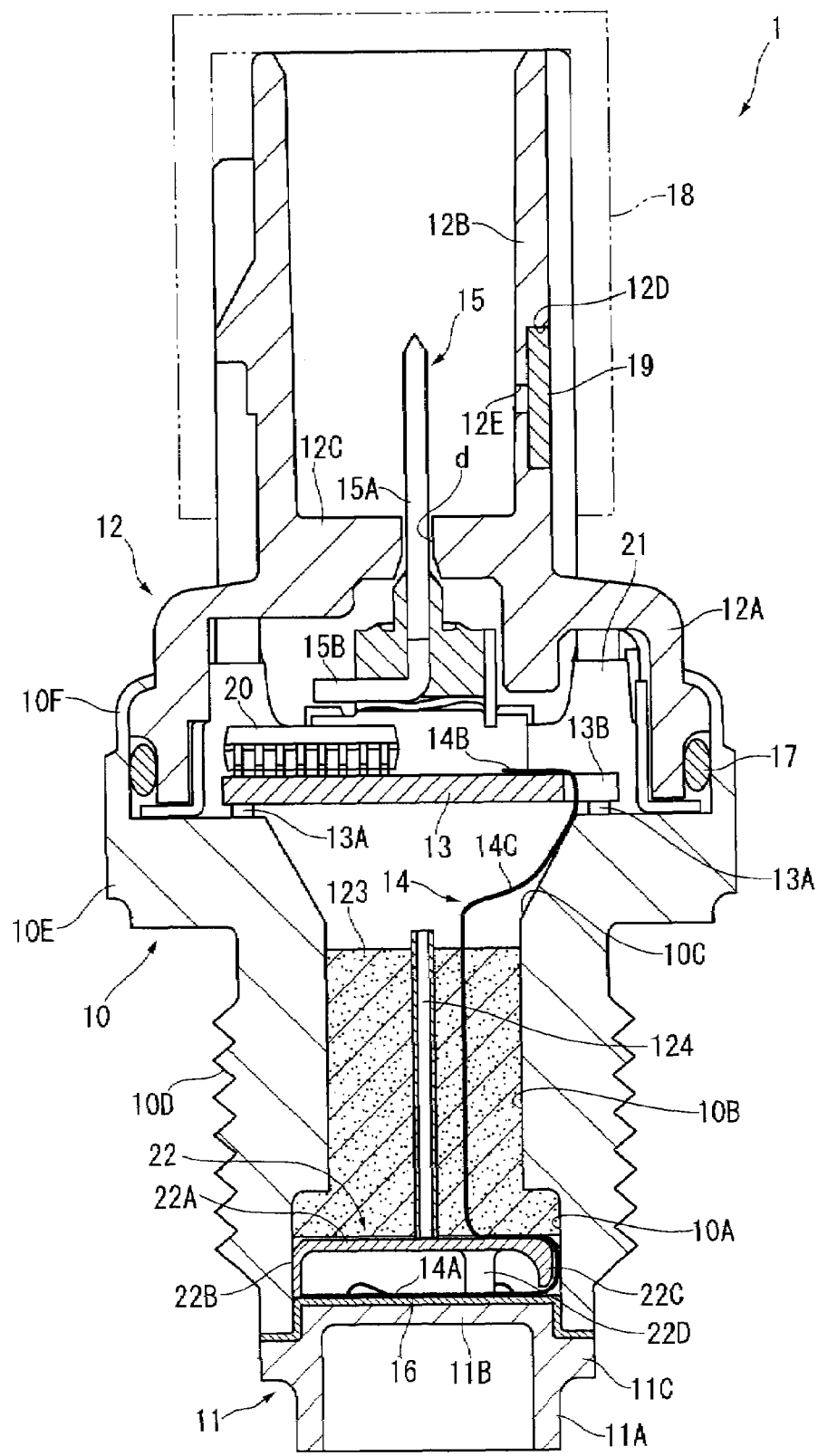
FIG. 8 is a cross section of a pressure sensor according to a second exemplary embodiment of the invention.

FIG. 8 is a cross section showing an entire arrangement of the second exemplary embodiment.

As shown in FIG. 8, an elastic board holder 123 that holds the flexible board 14 is disposed adjacent to the cover 22 within the joint 10.

In FIG. 8, the board holder 123 is provided by filling a recessed space defined by an upper side of the cover 22 and the inner circumference of the joint 10 with a heat-conductive molding material. The heat-conductive molding material is a room-temperature curing or heat-curing material, which is flowable before being filled in the space within the joint 10 (i.e. before being cured) and is cured after being filled in the space within the joint 10 at a room-temperature or by heating to a predetermined temperature.

A tube 124 penetrates through the board holder 123 for adjusting variable internal pressure within the cover 22. The tube 124 is a rubber-made component that intercommunicates the sensor-interior space adjacent to the diaphragm 11 and the sensor-interior space on a side remote from the diaphragm 11.

Incidentally, though an end of the board holder 123 near the circuit board 13 shown in FIG. 8 does not reach the periphery of the tapered hole 10C, the end of the board holder 123 may be located at a position adjacent to the circuit board 13. In this case, an end of the tube 124 is also extended toward the neighborhood of the circuit board 13.

Next, how the pressure sensor 1 according to the second exemplary embodiment is assembled will be described.

Initially, as in the first exemplary embodiment, the cap 16 and the cover 22 are adhered with an adhesive and the belt portion 14C of the flexible board 14 is placed on the arc surface 22C of the cover 22 and is bent in an arc. The belt portion 14C of the flexible board 14 is bent substantially at a right angle in a direction reverse to that in the preceding bending. Then, the bent belt portion 14C is placed in the interior space of the joint 10. Further, in this state, the tube 124 is inserted into the cover 22 and the molding material of the board holder 123 is filled into the interior space of the joint 10 (see FIG. 8).

After the joint 10 and the diaphragm 11 are airtightly connected in the same manner as in the first exemplary embodiment, the circuit board 13 is fixed on the flange 10E of the joint 10 and the circuit board 13 and the flexible board 14 are soldered.

Then, the terminal 15 and the circuit board 13 are connected by precision resistance welding, the housing 12 assembled with the 0 ring 17 is inserted and the housing 12 is crimped to the joint 10.

Accordingly, the following advantages can be obtained in the second exemplary embodiment as well as advantages (1)-(3) and (6)-(9) of the first exemplary embodiment.

(10) Since the board holder 123 has an elasticity, the flexible board 14 is pressed onto the cover 22, so that the displacement of the flexible board 14 during the vibration of the sensor can be further effectively restrained.

(11) Since the board holder 123 is provided by filling a molding material into the interior space of the joint 10, the flexible board 14 can be supported during the formation of the board holder 123, so that the flexible board 14 can be supported with a simple arrangement.

(12) The diaphragm 11 is airtightly bonded to the joint 10 while the board holder 123 allows communication between the inside and the outside of the sensor through the tube 124 and the air-vent filter 19. Accordingly, irrespective of the change in the temperature and humidity, the atmosphere within the sensor does not become excessively humid, so that a sensor that is sufficiently adapted for a change in the environment can be provided.

Incidentally, the scope of the present invention is not limited to what is disclosed in the above exemplary embodiment, but modifications, improvements and the like are within the scope of the present invention as long as an object of the present invention can be achieved.

For instance, the board holders 23, 123 may not be provided in the exemplary embodiments.

When the board holders 23, 123 are provided, the specific construction thereof is not limited to those described in the exemplary embodiments. For instance, the material of the board holder may be hard synthetic resin or metal instead of urethane foam. However, it should be noted that, when metal is used as the board holder, since the board holder is disposed adjacent to or in contact with the copper pattern 14E of the flexible board 14, it is necessary that at least a part of the board holder to be in contact with the flexible board 14 is provided with nonconductive material.

The invention is not applied limitatively to the pressure sensor, but may be applied to a differential-pressure sensor, temperature sensor and the like.

Though the cover 22 is attached to the cap 16, the cover 22 of the invention may alternatively be attached to the diaphragm 11.

What is claimed is:

1. A sensor, comprising:
   a sensor element provided with a measuring portion and attached to a joint;
   a cap provided on the measuring portion of the sensor element;
   a flexible board having a first end connected to the cap and a second end extending in a direction away from the sensor element; and
   a cover that supports the flexible board while the flexible board is curved, the cover being attached to the cap or the sensor element and the cover having an arc surface that supports the flexible board while the flexible board is curved.

2. The sensor according to claim 1, wherein a board holder for holding the flexible board is provided within the joint.

3. The sensor according to claim 2, wherein the sensor element is airtightly bonded to the joint, and
   the board holder intercommunicates a sensor-interior space near the sensor element and another sensor-interior space remote from the sensor element.

4. The sensor according to claim 2, wherein the board holder has an elasticity.

5. A method for manufacturing a sensor comprising: a sensor element provided with a measuring portion and attached to a joint; a cap provided on the measuring portion of the sensor element; a flexible board having a first end connected to the cap and a second end extending in a direction away from the sensor element; and a cover that supports the flexible board while the flexible board is curved, the cover being attached to the cap or the sensor element and the cover having an arc surface that supports the flexible board while the flexible board is curved,
   the method comprising the steps of:
   attaching a cap on the sensor element;
   connecting the first end of the flexible board on the cap;
   attaching the cover on the cap or the sensor element;
   curving the flexible board along the arc surface of the cover; and
   directing the second end of the flexible board in a direction away from the sensor element to hold within the joint.

* * * * *